United States Patent Office  3,080,358
Patented Mar. 5, 1963

3,080,358
PREPARATION OF AZACYCLO-2,3-ALKENE-2-CHLORO-N-CARBOCHLORIDE
Johannes H. Ottenheym, Sittard, and Johan W. Garritsen, Geleen, Netherlands, assignors to Stamicarbon N.V., Heerlen, Netherlands
No Drawing. Filed Apr. 20, 1961, Ser. No. 104,216
Claims priority, application Netherlands Sept. 18, 1958
18 Claims. (Cl. 260—239.3)

The present invention relates to the preparation of azacyclo-2,3-alkene-2-chloro-N-carbochlorides from ω-lactams by reaction with phosgene.

This application is a continuation-in-part of our application, Serial No. 839,078, filed September 10, 1959, and now abandoned.

It is known from German Patent 917,669 that dicaprolactime ether

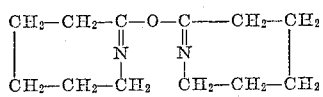

can be obtained by adding phosgene slowly to a solution of caprolactam in a solvent such as benzene. In this reaction, one molecule of phosgene enters into a reaction with two molecules of caprolactam, and hydrogen chloride and carbon dioxide are liberated.

While the mechanism of this reaction is not understood, it is believed explainable as a reaction of the enol form of caprolactam with the chlorination product initially formed by chlorination of the enol form of caprolactam. That is, chlorination of caprolactam is believed to result, initially, in formation of a compound

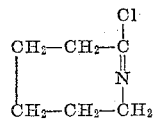

Caprolactam undergoes tautomerism as follows

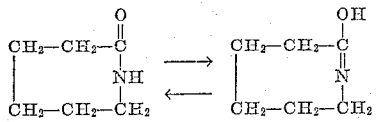

Interaction of this enol form with the initial chlorination product could explain the formation of dicaprolactime ether:

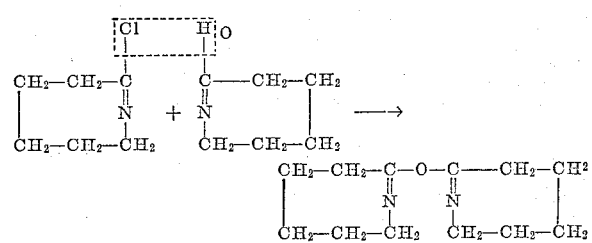

It has now been found that lactams, such as caprolactam, can be made to react with phosgene to obtain different products, azacyclo-2,3-alkene-2-chloro-N-carbochlorides:

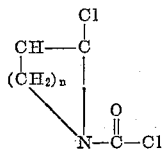

wherein $n$ is an integer greater than 1.

To achieve this result, the lactam is contacted with phosgene in the liquid phase while the substantial presence of uncombined free lactam in the reaction mixture is avoided by immediate reaction with phosgene. For this purpose, phosgene is present in sufficient excess to prevent any accumulation of such uncombined free lactam. Upon completion of the reaction, the products may be recovered, e.g. by distillation.

In general, there must be at least two moles of phosgene present in the reaction mixture for each mole of lactam. Larger amounts of phosgene may be used.

When no solvent is used, preferably, a large excess of phosgene is present. For example, in the latter case, 8–15 moles of phosgene may be used. One advantage of this is that large amounts of phosgene, in which other components of the reaction mixture are dissolved, can be easily stirred. This furthers a smooth reaction process.

If a solvent is employed, lesser amounts of phosgene, normally 3–5 moles of phosgene per mole of lactam are normally used.

Preferably, the reaction is carried out by passing the selected lactam into a body of phosgene maintained in the liquid phase. There will then be sufficient phosgene present to immediately react with lactam, as it is added, to avoid the presence of free uncombined lactam in the reaction mixture. Of course, any unreacted phosgene can be recovered and used again.

The reaction can easily be carried out as a continuous process. In this case the lactam and the phosgene can be passed into the reaction vessel simultaneously, at the appropriate relative rates.

Although liquid lactam may be reacted with liquid phosgene, the reaction is preferably carried out in an inert solvent. Suitable solvents are those normally used for lactams, for instance hydrocarbons, such as benzene, toluene or cyclohexane, and halogenated hydrocarbons, such as chloroform, monochlorobenzene or carbon tetrachloride. Due to the presence of the solvent, the non-converted phosgene can be easily removed from the reaction product, by distillation. To this end the use of a comparatively small amount of the solvent is sufficient, for instance as much as is needed for the preparation of a 20–60% lactam solution.

The reaction generally takes place at −5 to +170° C. Although excellent results can be obtained at a maximum reaction temperature of 60–90° C., preferably temperatures of the order of 115–150° C. are used, as it has been found that temperatures within this range give a high yield in a short period of time, e.g. 0.5 to 1.5 hours. The yield may be further increased by carrying out the reaction in two or more stages, in which case the temperature is kept at 25° C. to 90° C. in the first stage, or the first few stages, and at 115° C. to 150° C. in the last stage or the last few stages.

Preferably, the process of the present invention is carried out under pressure. This offers the advantage that the phosgene can be easily kept in the liquid state and that the above-mentioned reaction temperatures can also be applied when using solvents which normally boil at lower temperatures. A pressure of 5–50 atmospheres is sufficient for this purpose.

The lactams to which this process is applicable include ω-lactams in general. For example, caprolactam and ω-oenantolactam may be used as well as higher ω-lactams, for example, those containing up to 11 or 12 —$CH_2$— groups. Instead of using the free lactam, an acid halide salt, such as the hydrochloride, may be used. This salt dissociates in the reaction mixture to give free lactam which is immediately reacted with phosgene, thereby avoiding the presence of uncombined free lactam in the mixture. The chlorinated N-carbochlorides obtained as reaction products are of importance as insecticides. Insecticides ready for fighting insects such as flies or lice, for example on plants, may be obtained by mixing the chlorinated N-carbochlorides with inert diluents. Additionally, the products of the invention may be used in the preparation of 3-nitro-azacycloalkanone-2-N-carbochlorides as described in copending U.S. application Serial No. 839,074, now issued as U.S. Patent 3,031,443. The products of the invention may also be used in a preparation of α-halogeno-ω-lactams by the process described in our copending application Serial No. 839,075, now issued as U.S. Patent 3,000,881.

The invention is illustrated, but not limited, by the following examples:

Example 1

In a spherical 3 liter reaction vessel, provided with a stirrer and a reflux cooler, 400 g. phosgene are dissolved in 750 ml. chloroform at a temperature of 3–4° C. To this solution, a solution of 113 g. ε-caprolactam in 250 ml. chloroform is added slowly in two hours, during which time the temperature is kept below 10° C. While the temperature of the cooling medium in the reflux cooler is kept below —30° C., the temperature in the reaction vessel is raised to 30–35° C. At this temperature, the reaction process is continued for ¾ hour while refluxing the phosgene and the hydrogen chloride formed. Then the reflux cooler is replaced by a reflux cooler cooled with water of 20–30° C. and the temperature in the reaction vessel is raised to the boiling point of the solution (about 60° C.). Thereafter the solution is boiled for 1 hour while refluxing the chloroform, during which process the excess of phosgene and the hydrogen chloride are separated off.

Subsequently approximately half of the chloroform is distilled off at the same temperature, after which the remaining chloroform solution is washed acid-free with water. After the chloroform has been evaporated, the reaction product is distilled in vacuo. 187.5 g. of azacyclo-2,3 heptene-2-chloro-N-carbochloride are obtained, corresponding to a yield of 96.6%. The amount of residue is 2 g.

Example 2

In the reaction vessel used in Example 1, 500 ml. chloroform, containing 226 g. dissolved ε-caprolactam are added slowly at a temperature of 10–15° C. to 500 ml. chloroform containing 200 g. of dissolved phosgene.

While the lactam solution is being added, phosgene is also fed into the reaction mixture, at the rate of 70 liters per hour. Then the temperature is raised slowly, in 30 minutes, to 35° C., the solution is boiled under reflux for 1½ hours. Phosgene and hydrogen chloride are carried off by means of a nitrogen current.

Then, about 70% of the chloroform is distilled off and the remaining solution washed with 150 ml. water. For the recovery of entrained product, the washing water is extracted twice with 50 ml. chloroform. The chloroform solutions are combined and, after the chlorform has been removed by evaporation, the reaction product is distilled. 377 g. of carbochloride (yield 97.1%) and 3 g. of residue are obtained.

Example 3

108.5 g. of hydrochloric acid salt of ε-caprolactam (corresponding to 82 g. lactam) are brought into a one liter autoclave, provided with a magnetic stirrer. Then 760 g. of liquid phosgene are fed into the autoclave, which is then closed. Subsequently, the autoclave is slowly heated with simultaneous stirring to 67–70° C., during which operation the pressure rises to 25 atm., after which the temperature is kept constant. After a total reaction time of 6 hours, the autoclave is cooled down to room temperature and the excess of phosgene and the hydrochloric acid are removed. The reaction product is then distilled in vacuo, as a result of which 135 g. of carbochloride (yield 96.1%) and 4 g. of residue are obtained.

Example 4

A 45% by weight solution of ε-caprolactam in toluene was continuously pumped at the rate of 1 kg./h., into an autoclave having an effective capacity of one liter. At the same time phosgene was introduced in an amount sufficient to give 2.3 moles of phosgene per mole of caprolactam. The temperature in the autoclave was kept at 115° C. and the pressure at 15 atm. The contents of the autoclave were stirred thoroughly. The reaction mixture was continuously drained off, the mean residence time being 1 hour. From this mixture a sample was drawn, from which the toluene, phosgene and hydrochloric acid formed during the reaction, were removed by distillation. 85% by weight of the remaining reaction product consisted of pure azacyclo 2.3-heptene-2-chloro-N-carbochloride.

Example 5

Molten ε-caprolactam was introduced into an autoclave provided with a rapidly rotating stirrer at the rate of 1 kg./h., while at the same time phosgene was added in an amount sufficient to give 2.45 moles of phosgene per mole of caprolactam. The temperature in the autoclave was kept at 135° C. and the pressure at 15 atm. The reaction mixture was continuously drained off, the mean residence time being 1 hour. From a sample drawn from this mixture the phosgene and hydrochloric acid were removed by distillation. 86% by weight of the raw reaction product thus obtained consisted of pure azacyclo 2.3-heptene-2-chloro-N-carbochloride.

Example 6

A 30% by weight solution of ε-caprolactam in toluene was continuously pumped at the rate of 3 kg./h. through 4 consecutive autoclaves. At the same time phosgene was introduced into the first autoclave in an amount sufficient to give 2.0 moles of phosgene per mole of caprolactam. The temperatures in the consecutive autoclaves were 40°, 60°, 115° and 115° C., and the pressure in each autoclave was 15 atm. The total residence time in the system was less than 1 hour. After the removal of the solvent, 80% by weight of the raw reaction product obtained consisted of pure azacyclo 2.3-heptene-2-chloro-N-carbochloride.

Example 7

In the reaction vessel used in Example 1, 300 g. phosgene are dissolved in 500 ml. toluene at a temperature of 3–4° C. To this solution, a solution of 198 g. δ-valerolactam in 600 ml. toluene is added slowly in three hours, during which time the temperature is kept at 25–30° C.

While the lactam solution is being added, phosgene is also fed into the reaction mixture, at the rate of 300 g. per hour. Thereafter the reaction process is continued for two hours at a temperature of 25–30° C.

Until then a cooling medium having a temperature of —20° C. has been used in the reflux cooler. This is now replaced by water of 18–20° C. Thereafter the temperature is raised slowly, in 90 minutes, to 65° C. and the reaction is continued at this temperature for 4 hours.

Subsequently the excess of phosgene and the toluene are distilled off and the reaction product is distilled in vacuo. 355 g. of azacyclo 2.3-hexene 2-chloro N-carbochloride (boiling point at a pressure of 6mm. mercury =111° C., $n_D^{20}$=1.5363) are obtained, corresponding to a yield of 93%.

Example 8

In the reaction vessel used in Example 1, 300 g. phosgene are dissolved in 500 ml. toluene at a temperature of 3–4° C. Thereafter the temperature is raised to 25–30° C. and phosgene is fed into the reaction mixture during three hours, at the rate of 300 g. per hour. At the same time a solution of 254 g. ζ-oenantholactam in 600 ml. toluene is added. Subsequently the reaction is continued for two hours at a temperature of 20–25° C.

Until then a cooling medium having a temperature of −20° C. has been used in the reflux cooler. This is now replaced by water of 18–20° C. Thereafter the temperature is raised slowly, in 90 minutes to 65° C. and the reaction is continued at this temperature for 4 hours.

After the excess of phosgene and toluene has been distilled off, the reaction product is distilled in vacuo. 395 g. of azacyclo 2.3-octene 2-chloro N-carbochloride (boiling point at a pressure of 0.8 mm. mercury=112.5° C., $n_D^{20}$=1.5212) are obtained (yield 95%).

It will be appreciated that various modifications may be made in the invention described herein without departing from the scope thereof as set forth in the following claims.

What is claimed is:

1. A process for the preparation of azacyclo-2.3.alkene-2-chloro-N-carbochloride containing up to 12 carbon atoms in the alkene group, which comprises chlorinating the appropriate ω-lactam at the carbon atom of its carbonyl group and acylating the chlorinated product at its nitrogen atom, the said chlorination and acylation being carried out by contacting said lactam with phosgene in the liquid phase, while taking care that the presence of uncombined free lactam in the reaction mixture is avoided by immediate reaction with phosgene present in said mixture.

2. A process according to claim 1 in which the initial appropriate lactam is used in the form of its lactam hydrochloride salt, which is allowed to dissociate in the said reaction mixture while the presence of uncombined free lactam in said reaction mixture is avoided by immediate reaction with phosgene present in said mixture.

3. A process according to claim 1 in which the said reaction mixture is obtained by passing the said appropriate lactam into a body of phosgene maintained in the liquid phase, while taking care that the presence of uncombined free lactam in said reaction mixture is avoided by immediate reaction with phosgene present in said mixture.

4. The process of claim 1 wherein the reaction is carried out in the presence of a solvent.

5. The process of claim 1 wherein the reaction is carried out at a pressure of 5–50 atm.

6. The process of claim 1 wherein the reaction is carried out at 115 to 150° C. at a pressure of 5–50 atm.

7. A process as set forth in claim 1 in which the amount of phosgene used is at least two moles for each mole of ω-lactam.

8. A process as set forth in claim 1 in which the lactam is caparolactam.

9. A process as set forth in claim 1 in which the reaction temperature is between about −5° C. and 150° C.

10. A process as set forth in claim 1 for the preparation of azacyclo-2.3-alkene-2-chloro-N-carbochlorides in which said ω-lactam contains 4–12 carbon atoms in the ring structure.

11. The process of claim 1 wherein the reaction is first carried out at a temperature of 25°–90° C. and the temperature is subsequently raised to 115°–150° C.

12. The process of claim 3 wherein the reaction is first carried out at a temperature of −5° to +35° C. and the temperature is subsequently raised to from 45° to 90° C.

13. The process of claim 4 wherein said solvent is selected from the group consisting of hydrocarbons and halogenated hydrocarbons.

14. The process of claim 2 wherein the process is carried out in the absence of a solvent but in the presence of liquid phosgene.

15. The process of claim 2 wherein the reaction is carried out at a temperature not exceeding 100° C. and a pressure not exceeding 100 atmospheres.

16. The process of claim 15 wherein the reaction pressure is 25–50 atmospheres.

17. Azacyclo-2.3-heptene-2-chloro-N-carbochloride.

18. Azacyclo-2.3-octene-2-chloro-N-carbochloride.

No references cited.